(12) United States Patent
Yoshiura et al.

(10) Patent No.: US 6,665,417 B1
(45) Date of Patent: Dec. 16, 2003

(54) METHOD OF JUDGING DIGITAL WATERMARK INFORMATION

(75) Inventors: Hiroshi Yoshiura, Tokyo (JP); Kousuke Anzai, Fujisawa (JP); Yutaka Kurosu, Kanagawa-ken (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 09/452,467

(22) Filed: Dec. 2, 1999

(30) Foreign Application Priority Data

Dec. 2, 1998 (JP) .......................... P10-343120

(51) Int. Cl.$^7$ .................. G06K 9/00; H04N 7/167; H04L 9/00
(52) U.S. Cl. .................. 382/100; 382/232; 380/51; 380/210; 713/176
(58) Field of Search .................. 382/100, 232; 380/51, 54, 210, 252, 287; 713/176

(56) References Cited

U.S. PATENT DOCUMENTS 5,761,686 A * 6/1998 Bloomberg .................. 382/232
5,933,798 A * 8/1999 Linnartz .................. 380/202

* cited by examiner

*Primary Examiner*—Bhavesh M. Mehta
*Assistant Examiner*—Aaron Carter
(74) *Attorney, Agent, or Firm*—Antonelli, Terry, Stout & Kraus, LLP

(57) ABSTRACT

A digital watermark information judging method is provided for detecting digital watermark information which is embedded in at least one element of digital data by altering at least one data value of the element. The method first estimates the data value of the element by using data values of at least two neighboring elements of data located near the element, then compares the estimated data value with an actual data value of the element to detect the amount of the alteration, and judges the presence and value of the digital watermark information based on the amount of the alteration.

6 Claims, 13 Drawing Sheets

FIG.4

| Positions / Bit | Position 1 | Position 2 | ... | Position j | ... | Position 100 |
|---|---|---|---|---|---|---|
| b1 | P(1,1) | P(1,2) | ... | P(1,j) | ... | P(1,100) |
| b2 | P(2,1) | P(2,2) | ... | P(2,j) | ... | P(2,100) |
| ... | ... | ... | ... | ... | ... | ... |
| bi | P(i,1) | P(i,2) | ... | P(i,j) | ... | P(i,100) |
| ... | ... | ... | ... | ... | ... | ... |
| b50 | P(50,1) | P(50,2) | ... | P(50,j) | ... | P(50,100) |

FIG.6

| Bit | Extracted (and actual) luminance value |
|---|---|
| b1 | S1 |
| b2 | S2 |
| ... | ... |
| bi | Si |
| ... | ... |
| b50 | S50 |

FIG.8

| Bit | Estimated luminance value |
|-----|---------------------------|
| 1   | B1                        |
| 2   | B2                        |
| ... | ...                       |
| i   | Bi                        |
| ... | ...                       |
| 50  | B50                       |

METHOD OF JUDGING DIGITAL WATERMARK INFORMATION

BACKGROUND OF THE INVENTION

The present invention relates to a digital watermark technique for use with digital data, particularly image data.

Recently, from the viewpoint of copyright protection for digital data, such as image data, etc., a digital watermark technique has been attracting significant attention. A digital watermark technique is defined as a technique which involves the embedding of specific information into digital data according to a predetermined rule so that the specific information cannot be extracted from the digital data without using at least the predetermined rule. According to this technique, information, for example, concerning a purchaser of image data, etc., is embedded in the image data according to a predetermined rule in such a manner that the information is not visible. Then, when the image data has been illegally copied, using the predetermined rule, the embedded information is extracted from the data that was illegally copied, to specify that the person has illegally copied the data.

FIG. 11 is a diagram showing the principle involved in the process of embedding/extracting information into/from image data using a conventional digital watermark technique.

With respect to the information embedding processing, as shown in FIG. 11, when a bit bi ($1 \leq i \leq 50$) of bits b1–b50 constituting information to be embedded is equal to 1, the luminance of each pixel located at predetermined spaced positions of the image data is increased by U, and when the bit bi is equal to zero, the luminance of each such pixel is reduced by U. This processing is carried out for all of the bits b1–b50 while the embedding position is shifted, thereby embedding the digital watermark information in the image data.

On the other hand, the data value of the image data in which information was embedded, as stated above, may have been changed by conducting various image processings, including extension, reduction, compression, copying, etc. Therefore, with respect to extracting the embedded information, for the bit bi ($1 \leq i \leq 50$) of bits b1–b50, the luminance sum S of the pixel data values located at the predetermined spaced positions of the image data and the luminance sum R (Reference value) of the pixel data values adjacent to the predetermined positions are detected. If S−R>T (T is varied in accordance with a demanded error rate and it is set to satisfy T>U (the number of pixel data in which bi is embedded)), it is judged that bi is equal to 1. If S−R≦−T, it is judged that bi is equal to zero. If −T<S−R<T, it is judged that no information is embedded in each of the pixel data located at the predetermined spaced positions. This processing is carried out for all of the bits b1 to b50 to extract the digital watermark information embedded in the image data.

The above-mentioned digital watermark technique is described in more detail in Kobayashi. et al. : Data Hiding Based on Neighbor Pixels Statistics, In Proc. of IPSJ 56th Annual Conference, IV-03, (1998).

In the process of extracting the digital watermark information based on the above-reference conventional digital watermark technique, the differential value between the sum S of the luminance values of pixels located at positions estimating that bit bi is embedded therein and the sum R of the luminance values of pixel data adjacent to the pixels respectively located at these positions is calculated. Then, it is judged that information (bit bi) 1 or 0 has been embedded, when the differential value is statistically significant, and it is judged that information (bit bi) has not been embedded, when the differential value is not statistically significant.

Due to the ruggedness of the luminance of image data, such as at contours of an image, a remarkable luminance difference may occur between this pixel data and adjacent pixel data. Therefore, such circumstances may cause S−R>T or S−R<−T. In cases in which the ruggedness causes S−R>T or S−R<−T, it may be judged that information has been embedded in the image data in cases where such information has not been embedded. Conversely the ruggedness may cause −T<S−R<T in spite of the fact that information has embedded. In this case, it is incorrectly judged that information has not been embedded in the image data.

Although increasing the strength of U for embedding information and the criterion for extracting information (the threshold value T) can eliminate such misjudgments, this processing affects the quality of the image. The strength U is expressed by the equation $U = \Delta \times \sqrt{(V/N)}$, in which V is the variance of S−R, N is the number of pixel data of each bit, and $\Delta$ is the constant which depends on the detection accuracy. This equation concretely shows that the strength of U of the embedding information needs to be $\sqrt{n}$ times in order to keep the same detection accuracy, when the fluctuation (variance V) of S−R produced by the ruggedness of the luminance of the image becomes n times. It also shows that the same detection accuracy can be maintained in spite of a small U, when the fluctuation (variance V) of S−R becomes small.

SUMMARY OF THE INVENTION

The present invention is directed to the above-described circumstances, and an object of the present invention is to provide a digital watermark technique that can detect and extract embedded information precisely without increasing the strength of the embedding information.

Another object of the present invention is to provide a information embedding technique that can detect and extract embedded information precisely, while reducing any influence on the image quality, specifically preventing the image quality from degrading.

In order to achieve the foregoing objects, the present invention provides a method of judging digital watermark information which is embedded in at least one element of digital data by altering the at least one element of data.

The method comprises a first step of estimating a data value of the element by using data values of at least two neighboring elements of data located near the element; a second step of comparing the estimated data value with an actual data value of the element to detect the amount of the alteration thereof; and a third step of judging the presence and value of the digital watermark information based on the detected amount of the alteration. For example, the element data corresponds to pixel data, when the digital data is picture data, and the data value corresponds to a luminance value. The judgment carried out in the third step, for example, can be done by comparing a predetermined threshold with the amount of the alteration detected in the second step.

In recent years, the improvements in interpolation technology have been remarkable. When element data which constitutes digital data is lost, a lost element of data can be estimated from peripheral element data using such technology. In accordance with the present invention, data of an element, in which it is assumed that information is embedded, is estimated by using at least two elements of data near the element. The presumed data is used as reference data to compare to the actual data value of at least one element of data and to determine whether there is embedded digital watermark information and its value. Namely, it is judged whether or not information is embedded. The value is also determined when it is judged that information is embedded.

The above operation enables a more precise judgment than the conventional technology, since the presumed data value is nearly equal to the data value before embedding the information.

BRIEF DESCRIPTION OF THE DRAWINGS

FIG. 4 is a table in position storage 509 in FIG. 2, the table having information for specifying positions where the bits b1–b50 constituting digital watermark information are embedded in.

FIG. 6 is a table in the extracted luminance storage 510 in FIG. 2 which stores the sum of actual luminance values of pixels, which the bits b1–b50 are embedded.

FIG. 8 is a table in the estimated luminance storage 511 in FIG. 2 which stores the sum of calculated luminance values of pixels, in which the bits b1–b50 are embedded.

DETAILED DESCRIPTION OF THE PREFERRED EMBODIMENTS

First, prior to presenting a detailed description of a digital watermark information judgment device, to which the first embodiment of the present invention is applied, the principle of embedding information into image data or of judging the presence and value of such information in the image data will be described.

Figure 1:
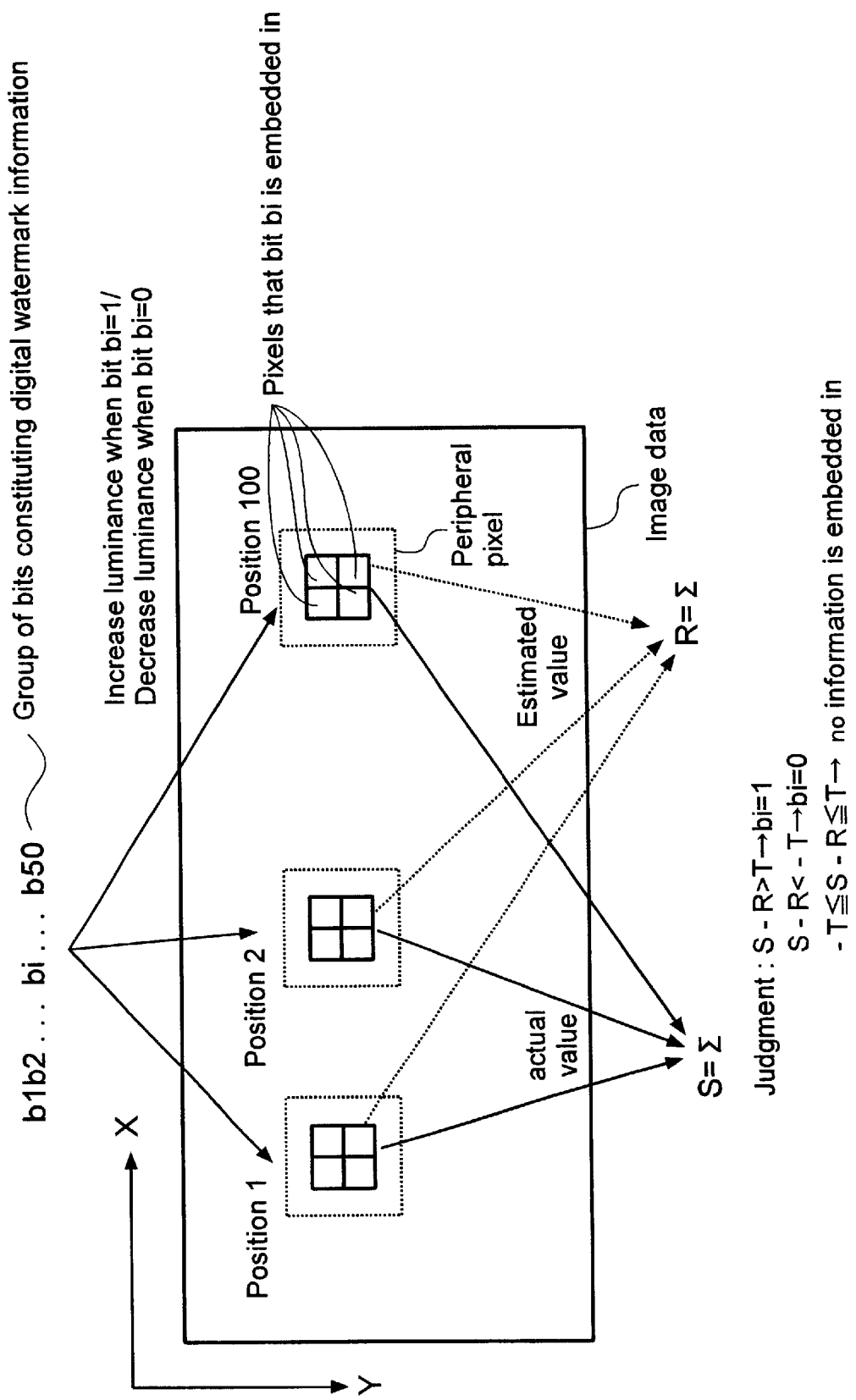
FIG. 1 is a diagram showing the principle of embedding information in image data and of detecting the embedded information according to a first embodiment of the present invention.

FIG. 1 is a diagram showing the principle of embedding information into image data or of judging the presence of such information in image data, as employed in the first embodiment.

With respect to the information embedding processing, as shown in FIG. 1, when a bit bi ($1 \leq i \leq 50$) of bits b1–b50 constituting information to be embedded is equal to 1, the luminance of each of the pixels of a 2×2 array located at predetermined spaced positions 1–100 in the image data is increased by U, and when the bit bi is equal to zero, the luminance of each such pixel data is reduced by U. This processing is carried out on all the bits b1 to b50 while the embedding position is shifted, thereby embedding bits b1 to b50 in the image data.

With respect to the process of judging the information thus embedded, f or the bit bi ($1 \leq i \leq 50$) of bits b1 to b50, the luminance values of the data of each of the 2–2 pixels located at the predetermined positions 1 to 100 of the image data are detected, and the sum S of the values (in this case 2×2×100=400 pixel values in total) is calculated. Each luminance value of the 2×2 pixels is estimated by interpolation which uses values of at least 2 pixels near the 2×2 pixels located at the predetermined positions 1 to 100, and the sum R of the estimated luminance values (in this case, 2×2×100=400 pixel values in total) is calculated. Thus, the difference between the sum S and the sum R is calculated.

If S–R>T (T is varied in accordance with a demanded bit error rate and it is set to satisfy $T \geq U \times$(the number of pixel data in which the bit bi is embedded, in this case 400)), it is judged that the bit bi is equal to 1. If S–R<–T, it is judged that the bit bi is equal to zero. If $-T \leq S-R \leq -T$. and it is judged that no information is embedded in each of the pixel data located at the predetermined positions 1 to 100 of the image data. This processing is carried out for all of the bits b1 to b50, which are embedded in the image data, respectively.

Figure 12:
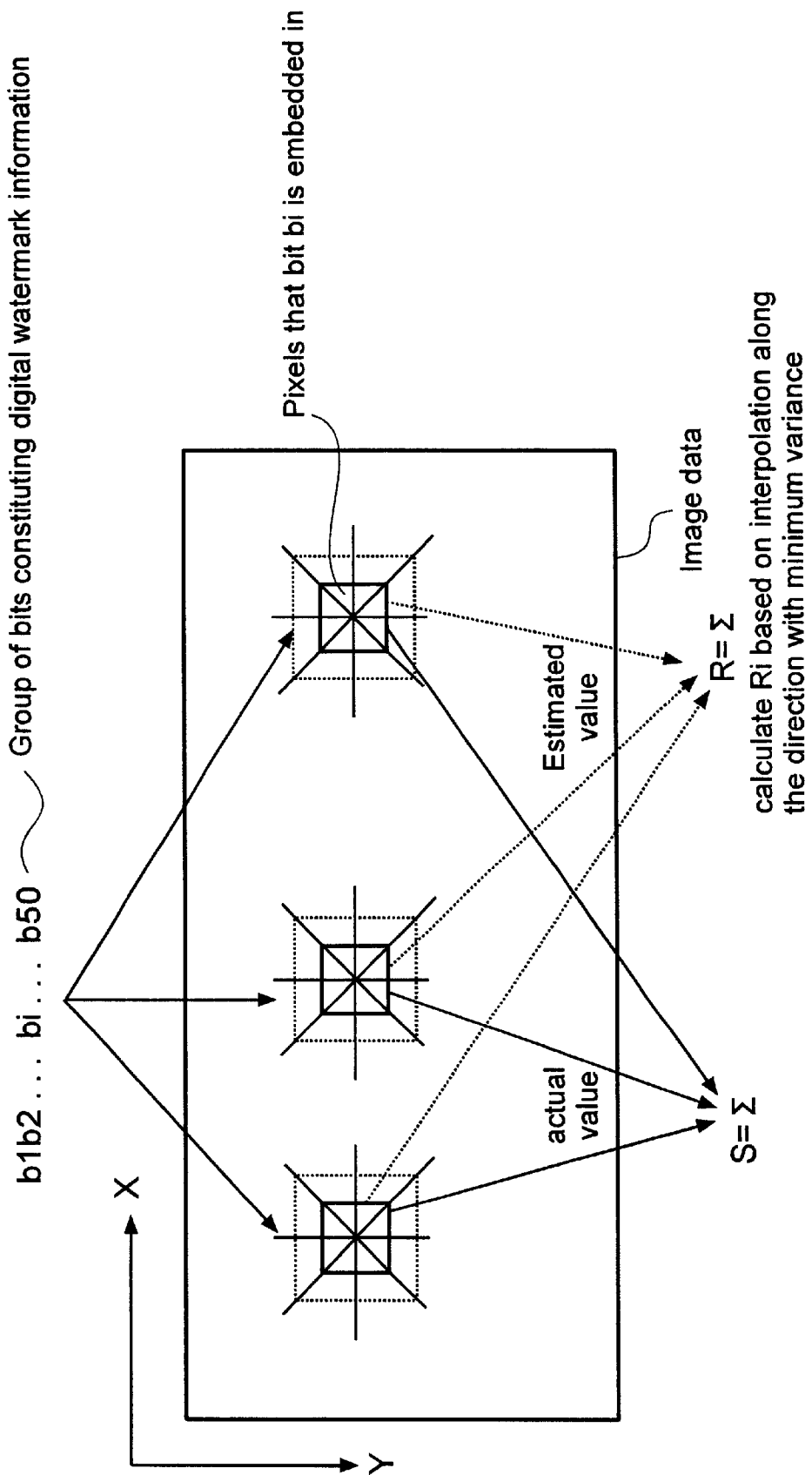
FIG. 12 is a diagram showing the principle of embedding information in image data and detecting the embedded information according to a modified embodiment of the present invention.

As an example, nearest neighbor interpolation, bi-linear interpolation, and cubic convolution interpolation may be used. The nearest neighbor interpolation is a method of adopting the luminance value of the nearest pixel to the pixel, the value of which is to be estimated. The bi-linear interpolation is a method of calculating the luminance value of the pixel by linear approximation using the values of four pixels around the pixel, the value of which is to be estimated. The cubic convolution interpolation is a method of calculating the luminance value of the pixel by three dimensions approximation using values of 16 pixels around the pixel, the value of which is to be estimated. As shown in FIG. 12, when estimating each luminance value of an array of 2×2 pixels, estimation in the direction with minimum fluctuation of luminance in the directions passing through peripheral pixels of the 2×2 pixels can be performed more correctly.

Figure 2:
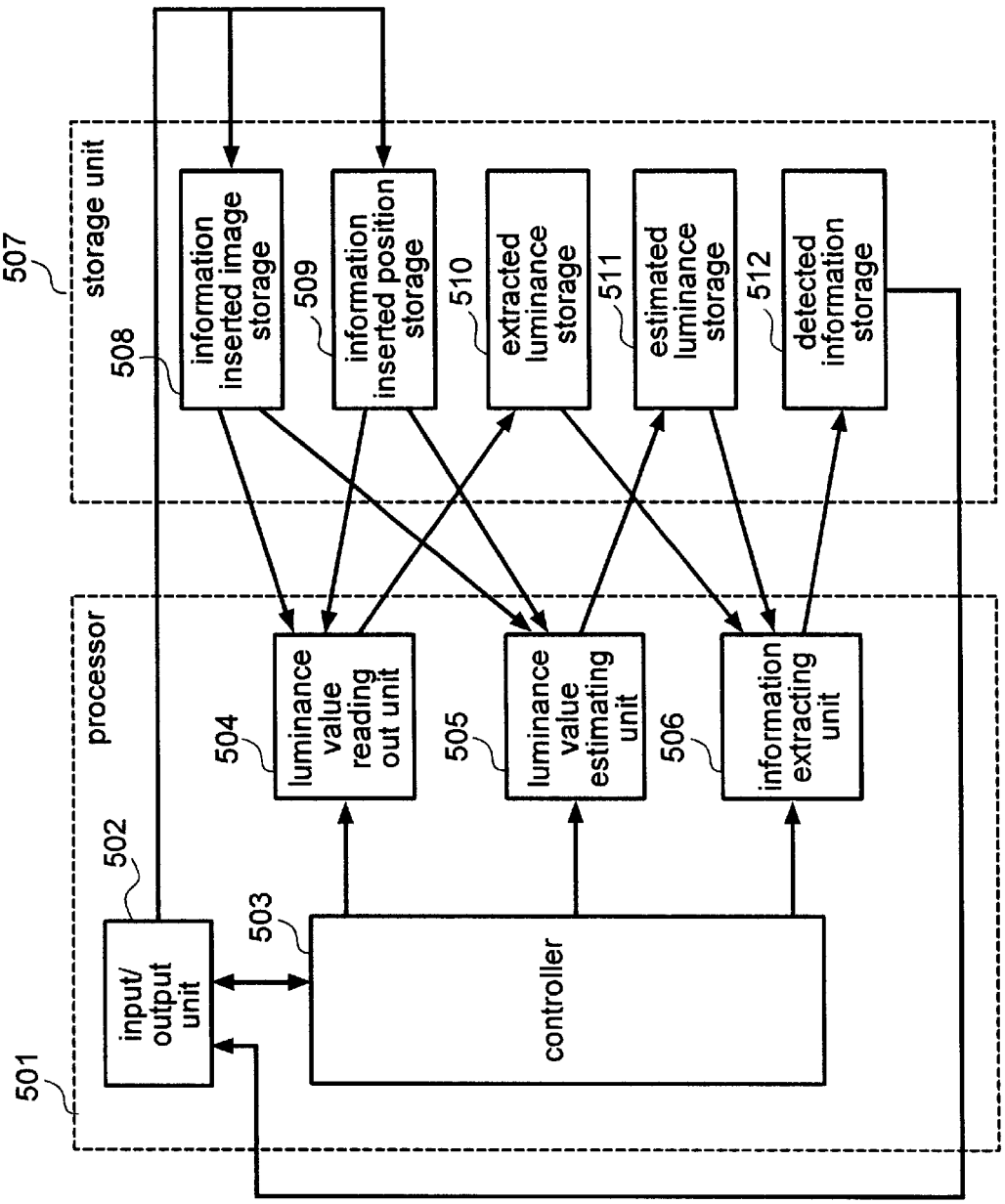
FIG. 2 is a functional block diagram showing a digital watermark information judgment device to which a first embodiment of the present invention is applied.

Next, a device for performing the processing for the above judgment of digital watermark information will be described. FIG. 2 is a block diagram of the digital watermark information judgment device to which the first embodiment of the present invention is applied.

As shown in FIG. 2, The digital watermark information judgment device of this embodiment comprises a processor 501 and a storage unit 507. The processor 501 comprises an input/output unit 502, serving to input/output image data having digital watermark information to be judged therein and to input/output the digital watermark information into/ from the image data concerned, a controller 503 for collectively controlling each part of the device, a luminance value reading out unit 504, a luminance value estimating unit 505, and an information extracting unit 506.

The storage unit 507 comprises an information inserted image storage 508 for storing image data, in which the digital watermark information is embedded, the data being inputted through the input/output unit 502; an information inserted position storage 509 for storing information to specify the positions where bits b1 to b50 constituting the digital watermark information are embedded; an extracted luminance storage 510; an estimated luminance storage 511; and a detected information storage 512.

Regarding the image data held in the storage 508, according to the information held in the storage 509, for each bit of the bits b1–b50 constituting digital watermark information, the unit 504 reads out the luminance value of 2×2 pixels of data respectively located in two or more places where the bit is embedded, and calculates the total S (this case, it becomes the total of 2×2×100=400 pixels per bit). Then, it read out the totals S calculated for each bit of the bits b1–b50 and stores this data in the luminance storage 510. The storage 509 holds information specifying a plurality of places where it is expected that the bits have been embedded.

Regarding the image data held in the storage 508, for each bit of the bits b1–b50 constituting digital watermark information, the luminance estimation unit 505 reads out the luminance values of at least two peripheral pixels near the 2'2 pixels specified by the information in the storage 509. The luminance value estimating unit 505 determines the luminance values of each of the 2'2 pixels by interpolation, using the luminance values of at least two of the peripheral pixels, and calculates the total R (in this case, a total of 2'2'100=400 pixels per bit). Then, it read out the totals R calculated for each bit of the bits b1–b50 and stores this data in the estimated luminance storage 511.

The information extraction unit 506 then calculates the difference S–R between the total R and the total S, and judges the value of the bit by comparing the difference S–R with the predetermined threshold value T. The bit is judged bi=1 when S–R>T, bi=0 when S–R<–T and no information is embedded when –T≦S–R≦T. The unit 506 carries out the process for each bit of b1–b50. In this embodiment it is presumed that the number of the bits (constituting the digital watermark information) is 50 and that each bit is embedded in a 2×2 pixel area, the positions and numbers of which are known. In this regard, the positions and the numbers may be identified by the party who embedded the information.

The hardware construction of the digital watermark information extraction device of this embodiment will be described in more detail with reference to FIG. 3, which shows the digital watermark information extraction device of FIG. 2.

Figure 3:
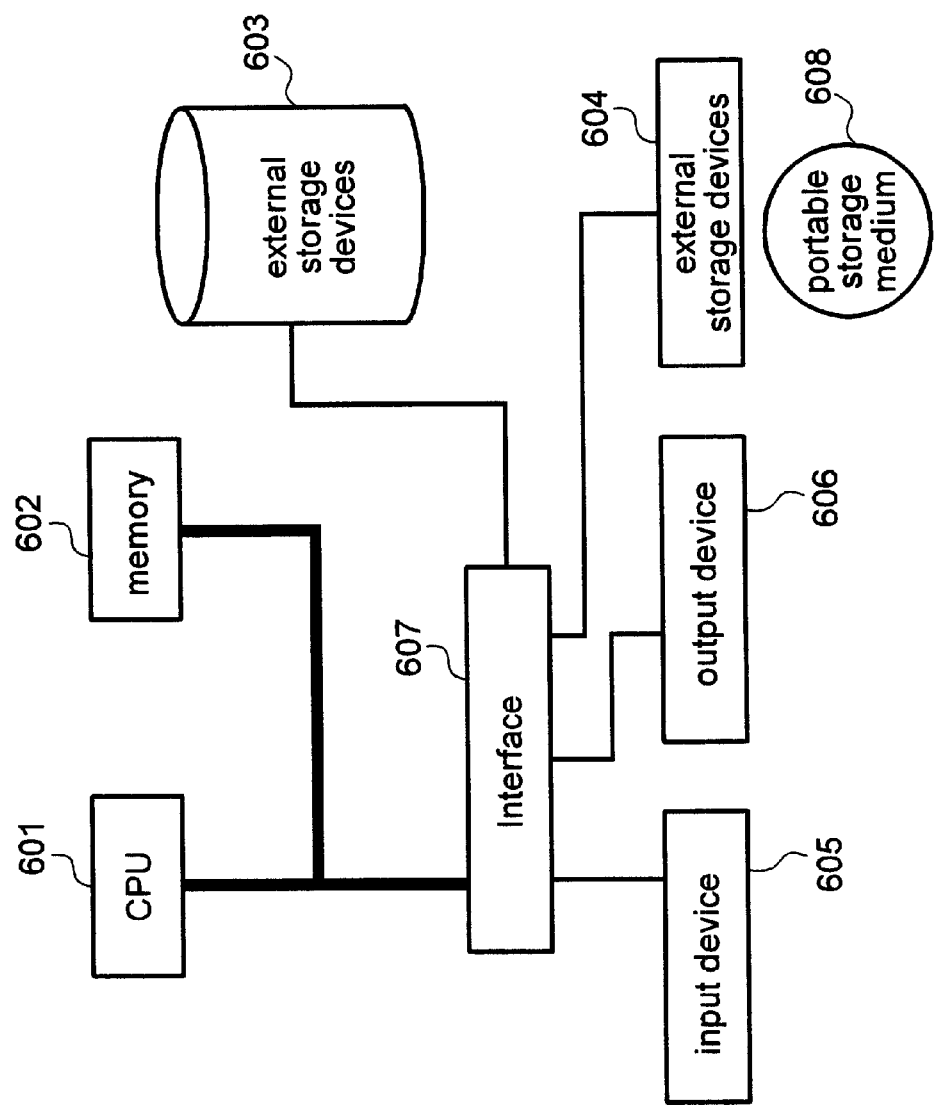
FIG. 3 is a block diagram of the digital watermark information judgment device shown in FIG. 2.

As shown in FIG. 3, the digital watermark information extraction device according to this embodiment can be formed of an information processing device which generally includes a CPU 601; a memory 602; an external storage device 603, such as a hard disc device; another external storage device 604; an input device 605, such as a keyboard; an output device 606, such as a display or the like; and an interface 607 for the external storage devices and the input/output device. Here, each part of the processor 501 shown in FIG. 2 is implemented as a process carried out by the information processing device by executing a program in the memory 602 by the CPU 601. In this case, the memory 602 and the external storage devices 603, 604 are used as the storage unit 407 shown in FIG. 2.

The program, which is executed by the CPU 601 to perform the functions of the digital watermark information extraction device of this embodiment, is stored in the external storage device 603, and it is loaded into the memory 602 and executed by the CPU 601, as occasion demands. Or, it may be located through the external storage device 604 from a portable storage medium 608, for example, a CD-ROM. From the portable storage medium 608, the program can be loaded directly into and then executed by the CPU 601. Alternatively, the program may be transferred from the portable storage medium 608 through the external storage device 604 and stored in the external storage device 603. Then, it may be loaded from the external storage device 603 into the memory 602 and executed by the CPU 601.

Next, the operation of the digital watermark information extraction device of this embodiment will be described.

First, the controller 503 causes image data to be transferred into the information-inserted image holder 508 in cooperation with the input/output unit 502 so as to judge digital watermark information embedded therein. The controller 503 preliminarily stores information in the information inserted position storage 509 to specify positions where information is embedded for each of the bits b1 to b50 in the image data. Each bit is embedded in 100 points in the image data in the case of FIG. 1.

FIG. 4 shows an example of a table in the storage 509, which table holds information to specify the positions where the bits b1 to b50 are embedded. As shown in FIG. 4, for each bit b1 to b50, there is provided a set of X and Y coordinates values which specify each of the positions 1 to 100 where the bit is embedded.

As shown in FIG. 1, since a 2×2 pixel block represents the area for the information being embedded, it is only required that the set of X and Y coordinate values in FIG. 4 specify whichever one pixel in each area. In this embodiment, it is assumed that the set of values specifies the pixel located at the upper left corner in each area. The position storage 509 in FIG. 2 may be provided as an area in the external storage device 603 and 604 in FIG. 3. The image data may be provided from a portable storage medium by way of a network interface device (not shown).

Figure 5:
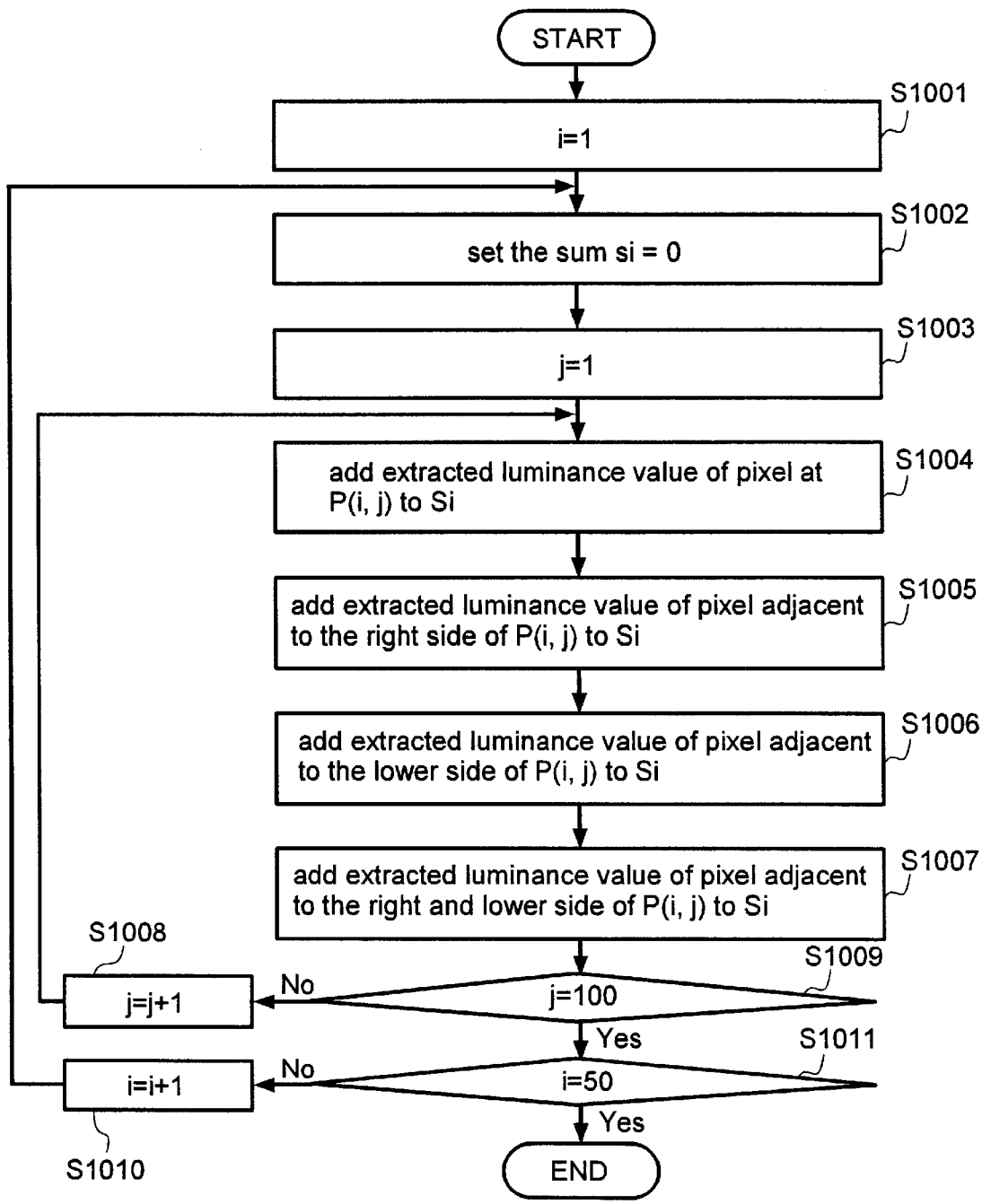
FIG. 5 is a flowchart showing the operation of calculating the sum of actual luminance values by the digital watermark information judgment device shown in FIG. 2.

The digital watermark information extraction device calculates, for each of the bits b1 to b50, the sum (S1 to S50) of actual luminance values of the pixels respectively located at the positions where the information is embedded. FIG. 5 is a flowchart showing the calculation for the totals S1–S50 by the digital watermark information extraction device in FIG. 2.

The controller 503 sets i, which specifies the bit bi for extracting the luminance, to 1 (step S1001) and sets the sum Si of extracted values of the pixels, in which the bit bi is embedded, to 0 (step S1002). The controller 503 then sets j, which specifies the position where information of the bit bi is embedded in to 1 (step S1003).

Next, the luminance value read out unit 504 reads the coordinates (k,l) of pixel data P(i,j) corresponding to the bit bi for the position j from the position storage 509 (see FIG. 4). The unit 504 reads the luminance value l(k,l) of the pixel at the coordinates (k,l) from the image data stored in the image data storage 508 and adds the value to the sum Si (step S1004). The unit 504 next reads out the luminance value l(k+1,l) of the pixel data at the coordinates (k+1,l), which is adjacent to the pixel P(i,j) on the right side thereof, from the image data stored in the image data storage 508 and adds the value to the sum Si (step S1005). The unit 504 next reads out the luminance value l(k,l+1) of the pixel at the coordinates (k,l+1), which is adjacent to the pixel P(i,j) on the lower side thereof, from the image picture data stored in the information inserted image data storage 508 and adds the value to the sum Si (step S1006). Finally, the unit 504 reads the luminance value l(k+1,l+1) of the pixel data at the coordinates (k+1,l+1), which is adjacent to the pixel P(i,j) on the right and lower side thereof, from the image data stored in the image data storage 508 and adds the value to the sum Si (step S1007).

According to the processing in steps S1004 to S1007, all of the actual luminance values are extracted from the 2×2 pixels located at the position j where information of the bit bi is embedded and the values are added to the sum Si. The controller 503 then increases j by 1 (S1008) and repeats the steps S1004 to S1008 through j=100 (S1009). Thus, according to the above processing, all of the actual luminance values are extracted from the 2×2 pixels located at the positions 1 to 100 where information of the bit bi is embedded and the sum Si of the values is calculated. The luminance value read out unit 504 stores the calculated sum Si in correspondence to the bit bi in the luminance storage 510.

The controller 503 then increases i by 1 (S1010) and repeats the steps S1002–S1010 through i=50 (S1011). According to this processing, as shown in FIG. 6, each of the sums S1–S50 of the actual luminance values calculated on the basis of values of the pixels located at the positions, where each of the bits b1–b50 is embedded, is stored in correspondence with the respective bits b1 to b50.

Figure 7:
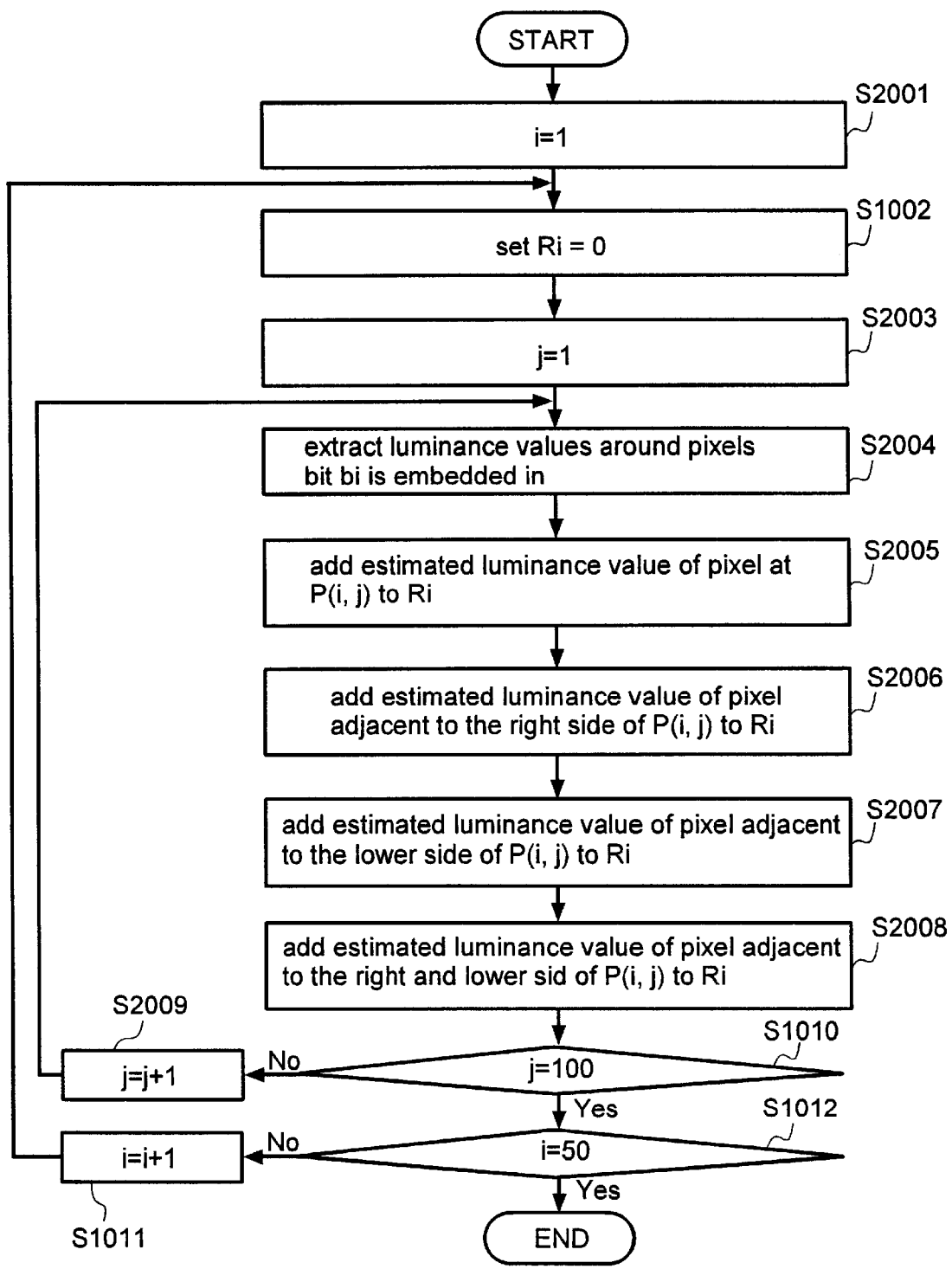
FIG. 7 is a flowchart showing the operation of estimation for sums R1–R50, for each of the bits b1–b50, by the digital watermark information extraction device in FIG. 2.

The device also estimates, for each of the bits b1 to b50, the luminance values of the pixels located at the positions where the information is embedded, and calculates the sums R1 to R50 of the estimated values, respectively. FIG. 7 is a flowchart showing the estimation and the calculation processes carried out by the digital watermark information extraction device in FIG. 2 to obtain the sums R1–R50.

The controller 503 sets i, which specifies the bit bi for extracting the luminance, to 1 (step S2001), and sets the sum Ri of estimated values of the pixels, in which the bit bi is embedded to 0 (step S2002). The controller 503 then sets j, which specifies the position where information of the bit bi is embedded to 1 (step S2003).

Next, the luminance value estimating unit 505 reads the coordinates (k,l) of pixel data P(i,j) corresponding to the bit bi for the position j from the position storage 509 (see FIG. 4). The unit 504 then reads luminance values of at least two pixels located near the 2×2 pixel area from the image data stored in the image data storage 508 (step S2004). In this embodiment, the pixel with the coordinates (k,l) is located at the upper left corner in the 2×2 pixel area, and eight luminance values, i.e., I(k,l−1), I((K+1,l−1), I(k,l+2), 1(k+1,l+2), I(k+2,1), I(k+2,l+1)), of the pixels adjacent to the 2×2 pixel area are read.

The luminance value estimation unit 505 estimates the luminance value of the pixel P(i,j) according to the position data and the luminance values of at least two of the peripheral pixels by interpolation. The unit 505 calculates the luminance value l(k,l) of the pixel P(i,j) located at the coordinates (k,l). The calculation is performed by bi-linear interpolation using the luminance values of the pixels located at upper, lower, right and left positions of the 2'2 pixel area, i.e., l(k,l−1), l(k,l+2), l(k−1,l), l(k+2,l). The unit 505 adds the calculated l(k,l) to the sum Ri.

Similarly, the unit 505 calculates the luminance value I(k+1,l) of the pixel with the coordinates (k+1,l) adjacent to the pixel P(i,j) on the right side thereof, and adds the value to the sum Ri (step 2006). Then, the unit 505 calculates the luminance value I(k,l+1) of the pixel at on the coordinates (k,l+1) adjacent to the pixel P(i,j) on the lower side thereof, and adds the value to the sum Ri (step 2007). Similarly, the unit 505 calculates the luminance value I(k+1,l+1) of the pixel at on the coordinates (k+1,l+1) adjacent to the pixel P(i,j) on the right and lower side thereof, and adds the value to the sum Ri (step 2008).

According to the above processing, the unit 505 estimates all of the luminance values of the 2×2 pixels located at the position j where the bit bi is embedded and adds the values to the sum Ri. The controller 503 then increases j by 1 (S2010) and repeats the steps S2005 to S2009 through j=100 (S2010). Thus, according to the above processing, all of the luminance values are estimated in the 2×2 pixel area are performed at the positions 1 to 100 where information of the bit bi is embedded, and the sum Ri of the values is calculated. The luminance value read out unit 504 stores the calculated sum Ri in correspondence to the bit bi in the estimated luminance storage 511.

The controller 503 then increases i by 1 (S2011) and repeats the steps S2002 to S2011 through i=50 (S2012). According to the above processing, as shown in FIG. 8, each of the sums R1 to S50 of the estimated luminance values calculated on the basis of values of the pixels at the positions where each of the bits b1 to b50 is embedded, is stored in correspondence with the respective bits b1 to b50.

Figure 9:
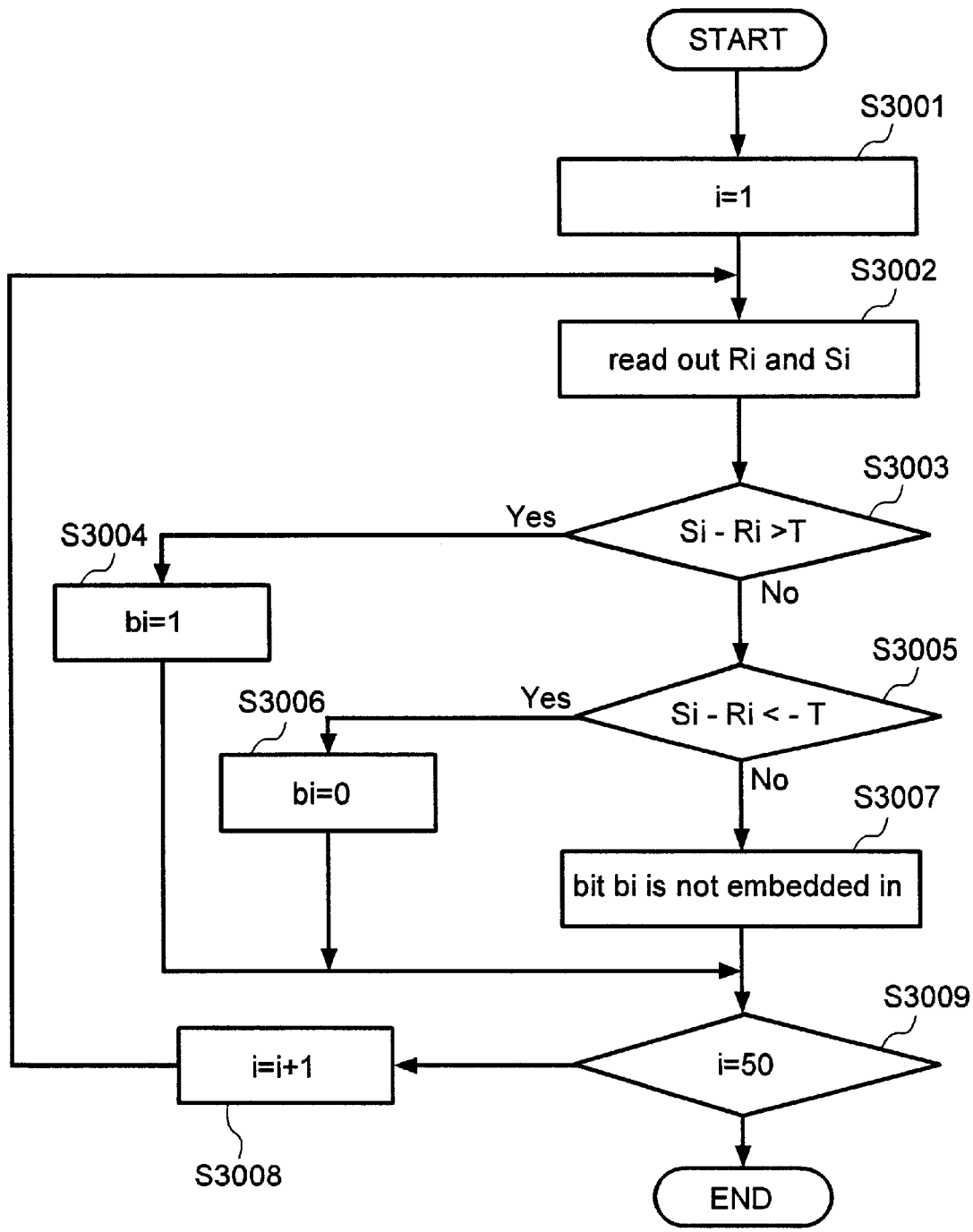
FIG. 9 is a flowchart showing the operation of comparing the sums S1–S50 with the sums R1–R50, respectively, to judge the bit values of bits b1–b50 constituting the digital watermark information.

The digital watermark information extraction device compares the sums S1–S50 with the sums R1–R50, respectively, to judge the bit values of bits b1–b50 which constitute the digital watermark information. FIG. 9 is a flowchart showing how this comparison process is carried out.

The controller 503 sets i, which specifies the bit bi for judging the bit value, to 1 (step S3001). The information extraction unit 506 then reads the sum Ri from the luminance storage 510 and the sum Si from the estimated luminance storage 511 for the specified bit bi (step S3002). The unit 506 judges whether or not the difference Si–Ri between the sum Ri and the sum Si is larger than the predetermined threshold T.

When the difference is larger than T, the unit 506 judges the bit bi=1 and stores the result into the detected information storage 512 (step S3004). When the difference is smaller than −T (step S3005), the unit 506 judges the bit bi=0 and stores this result into the storage 512 (step S3006). In steps S3003 and S3005, when the unit 506 judges that the difference is neither larger than T nor smaller than −T, namely −T≦Si≦Ri<T, the unit 506 judges that the bit bi is not embedded and stores that judgement into the storage 512 (step S3007).

The controller 503 then increases i by I (S3008) and repeats the steps S3002 to S3008 through i=50 (S3009). Accordingly, the judgments relating to all of the b1–b50 are stored in the storage 512. This result is output, through the input/output unit 502, to the output device 606, such as a display or the like.

According to the embodiment, for each pixel in the pixel area located at the positions where it is expected that the information is embedded, the luminance value with no embedded information is estimated by interpolation based on at least two peripheral pixels near the area. The actual luminance value is compared with an estimated value which is nearly equal the previous value before the information was embedded.

According to the present invention, in spite of not increasing the threshold T or the strength U in the embedding of information, the embedded information can be judged or extracted precisely. Furthermore, the invention makes it possible to prevent a degrading of the image data which typically occurs when the strength T is increased.

The present invention is not limited to the above embodiment, and various modifications may be made without departing from the subject matter of the present invention.

Figure 10:
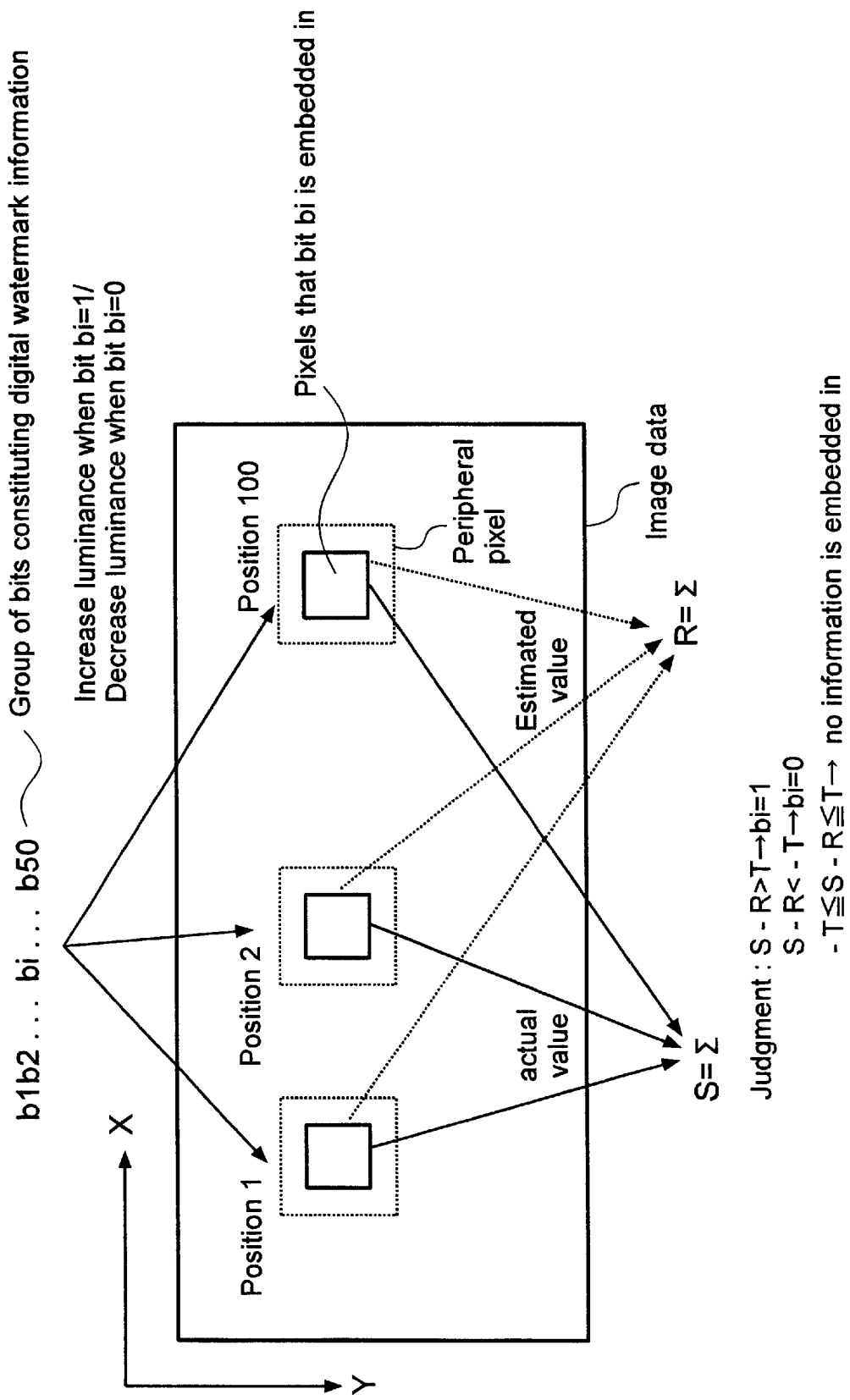
FIG. 10 is a diagram showing the principle of embedding information in image data and judging of the embedded information according to a modified embodiment of the present invention.
Figure 11:
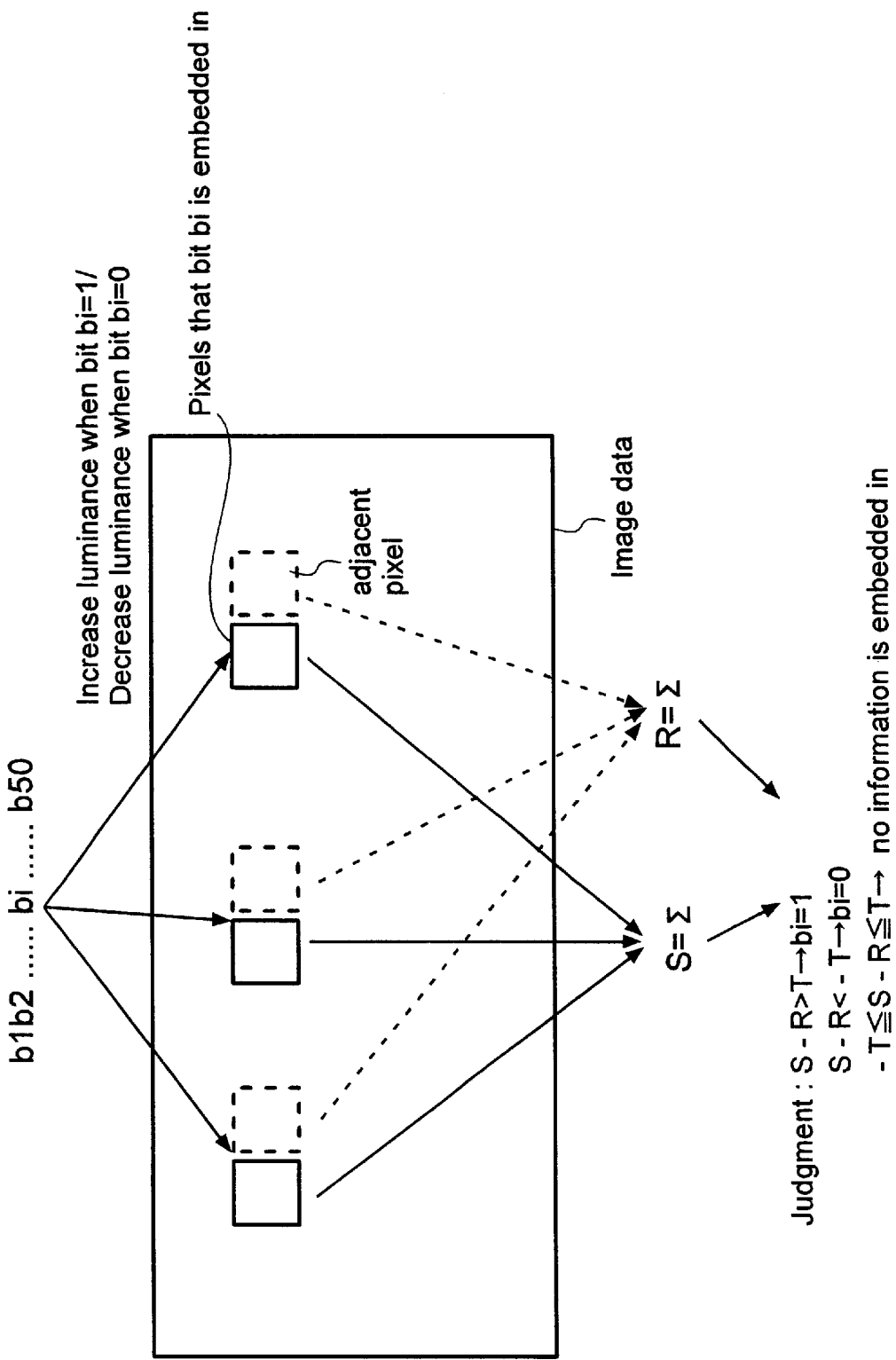
FIG. 11 is a diagram showing the principle of information embedding/extraction processing for image data based on a conventional digital watermark technique.

For example, as shown in FIG. 10, each area where information is embedded may be constituted by one pixel located at positions 1 to 100 respectively. In such case, steps 1005 to 1007 in FIG. 5 and steps 2006 to 2008 in FIG. 7 can be eliminated. In steps S3003 and S3005, when the unit 506 judges that the difference is neither large than T nor smaller than −T, namely, −T≦Si−Ri≦T, the unit 506 determines that the bit bi is not embedded and stores that judgement into the storage 512 (step S3007). With this modification, whether or not information is embedded can be judged as a first step.

The present invention also is not limited to the number of bits constituting digital watermark information, the size of the pixel area for embedding the bits, the position of the area or the number of areas, as specified for the above embodiment. The above embodiment assumes a particular number of bits constituting the digital watermark information, a particular size of the pixel area for embedding the bits, a particular position of the area or a given number of areas, but the present invention is not limited to these exemplary values.

It is possible to search a position where the bit is embedded in the manner described with reference to FIG. 9 or variations thereof.

Interpolation can be used to estimate the variation of other characteristics (ex. value of color difference, YCrCb, RGB, or CMYK), rather than luminance, in a way similar to that used for judging embedded information, as described above.

Another type of interpolation, rather than bi-linear interpolation, can be used, when the interpolation makes it possible to calculate the value of the pixel located at the position P(i,j) based on peripheral pixel data. For example, the nearest neighbor interpolation, cubic convolution interpolation or linear interpolation in the direction with minimum variance can be employed.

Figure 13:
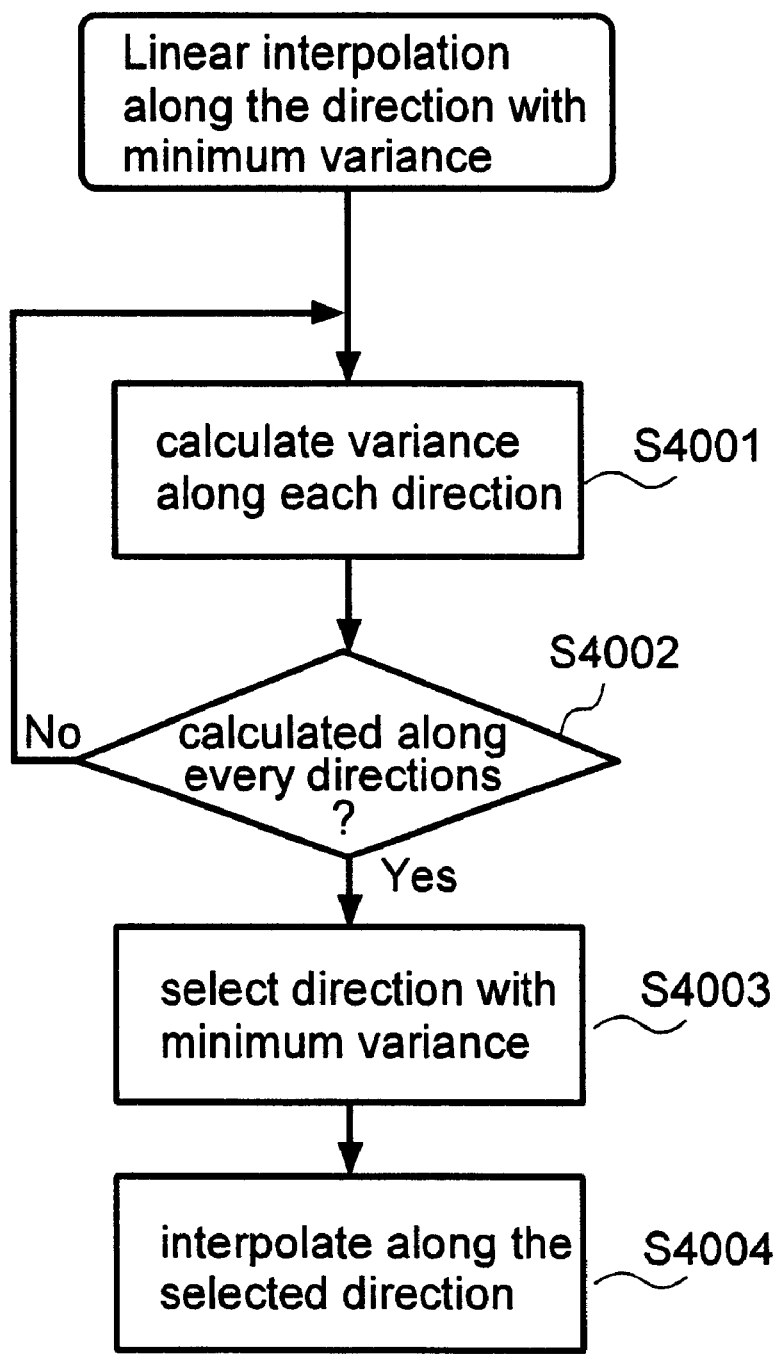
FIG. 13 is a flowchart showing the operation of determining the direction for interpolation according to the principle described in FIG. 12.

FIG. 13 is a flowchart describing the use of linear interpolation in the direction with minimum variance. A variance in plurality of directions within a predetermined area is calculated for each pixel for which it is desired to estimate the luminance value. (S4001) The direction having a minimum variance is selected from the plurality of directions. (S4003) Then, a linear interpolation in the selected direction is performed. (S4004) A more detailed description of this process is as follows.

It is assumed that the luminance value l(k,l) refers to the value of the pixel P(i,j) located at the coordinates (k,l). The vertical variance, Vv=|I(k,l−1)−I(k,l+2)| and the horizontal variance Vh=| (k−1,l)−I(k+2,l)| are calculated based on luminance values of peripheral pixels located around the pixel P(i,j). A linear interpolation is performed in the direction selected by comparison of Vv and Vh. When the Vv is smallest, the luminance value IR(k,l) is calculated using the equation (2×I(k,l−1)+I(k,l+2))/3. When the Vh is smallest, the luminance value IR(k,l) is calculated using the equation (2×I(k−1,l)+I(kt2,1))/3.

Besides Vv and Vh, more variances in other directions, including an oblique directions, for example 4 or 8 directions, can be compared to select the minimum variance. It is desirable to calculate the variance based on values of more peripheral pixels in a wider area than 2 pixels.

According to the above processing, even when the embedded information in a pixel on contour of an image produces a remarkable difference in the estimated value by direction, a precise estimation is possible.

Since the invention can reduce the amount of change of value as long as the embedded information can be detected, the present invention can be used to determine how much luminance value should be varied for precisely extracting information.

Regarding the pixels in which information should be embedded, the strength of U can be determined by the difference between the sum Si, which is the sum of the actual values without information, and the sum Ri, which is the sum of the calculated values according to the above embodiments using the value of peripheral pixels. In this way, it is possible to detect information precisely and prevent the image data from degrading.

Moreover, the application of the present invention is not limited to image data. Besides image data, the invention can be applied to other digital data as long as the original data, before the embedding of information, can be calculated precisely by interpolation based on peripheral data.

As described above, according to the present invention, the detection of embedded information in digital data and protection of the digital data from degradation caused by embedding information therein are enabled.

What is claimed is:

1. A digital watermark information judging method for judging the presence and value of digital watermark information which is embedded in at least one element of digital data by altering at least one data value of said element, comprising the steps of:

estimating a data value of said element by using data values of at least two neighboring elements of data located near said element;

comparing said estimated data value with an actual data value of said element to detect the amount of the alteration thereof; and judging the presence and value of said digital watermark information based on the detected amount of the alteration;

wherein said estimating step comprises (a) calculating a variance based upon data values of at least two neighboring elements along a first direction extending through said element to be estimated, (b) repeating the calculation of variance based upon data values of at least two neighboring elements along at least one other direction extending through said element to be estimated different than said first direction, (c) selecting a direction with minimum variance from the calculated variances of said first direction and said at least one other direction extending through said element to be estimated, and (d) estimating said data value of said element to be estimated by using data values of elements included in a set of elements along the selected direction.

2. A digital watermark information judging method according to claim 1, in which said digital watermark information is embedded in a plurality of elements; wherein said estimating step comprises estimating the data value of each of a plurality of elements, by using at least two neighboring elements of data near each of said plurality of elements;

wherein said comparing step comprises calculating a value S by summing actual data values of said a plurality of elements;

calculating a value R by summing estimated data values of said a plurality of elements; and calculating sum of alterations between said sum value S and said sum value R; and wherein said judging step comprises comparing said sum of alterations with a predetermined threshold value.

3. A digital watermark information judging method according to claim 1, wherein said digital data is image data; and wherein said element is a pixel.

4. A digital watermark information judging method according to claim 1, wherein said data value is a luminance value.

5. A storage medium for storing therein a digital watermark information judging program for judging the presence and value of digital watermark information which is embedded in at least one element of digital data by altering at least one data value of said element, wherein said program causes a computer to execute the steps of:

estimating a data value of said element by using data values of at least two neighboring elements of data located near said element;

comparing said estimated data value with an actual data value of said element to detect the amount of the alteration thereof; and judging the presence and value of said digital watermark information based on the detected amount of the alteration;

wherein the step of estimating includes (a) calculating a variance based upon data values of at least two neighboring elements along a first direction extending through said element to be estimated, (b) repeating the calculation of variance based upon data values of at least two neighboring elements along at least one other direction extending through said element to be estimated different than said first direction, (c) selecting a direction with minimum variance from the calculated variances of said first direction and said at least one other direction extending through said element to be estimated, and (d) estimating said data value of said element to be estimated by using data values of elements included in a set of elements along the selected direction.

6. A digital watermark information judging device for judging the presence and value of digital watermark information which is embedded in at least one element of digital data by altering at least one data value of said element, comprising:

means for estimating a data value of said element by using data values of at least two neighboring elements of data located near said element;

means for comparing said estimated data value with an actual data value of said element to detect the amount of the alteration thereof; and means for judging the presence and value of said digital watermark information based on the detected amount of the alteration;

wherein said means for estimating includes means for (a) calculating a variance based upon data values of at least two neighboring elements along a first direction extending through said element to be estimated, (b) repeating the calculation of variance based upon data values of at least two neighboring elements along at least one other direction extending through said element to be estimated different than said first direction, (c) selecting a direction with minimum variance from the calculated variances of said first direction and said at least one other direction extending through said element to be estimated, and (d) estimating said data value of said element to be estimated by using data values of elements included in a set of elements along the selected direction.

* * * * *